March 6, 1962  A. G. STIMSON  3,023,684
CAMERA WITH PENDULAR PHOTOCELL
Filed Dec. 5, 1958  4 Sheets-Sheet 1

Allen G. Stimson
INVENTOR.

BY R. Frank Smith
Robert W. Hampton
ATTORNEYS

March 6, 1962 A. G. STIMSON 3,023,684
CAMERA WITH PENDULAR PHOTOCELL
Filed Dec. 5, 1958 4 Sheets-Sheet 2
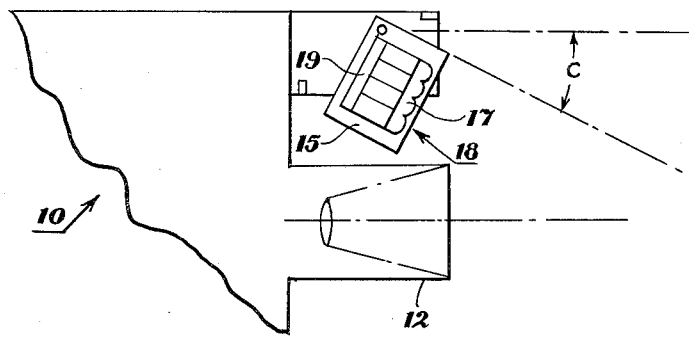
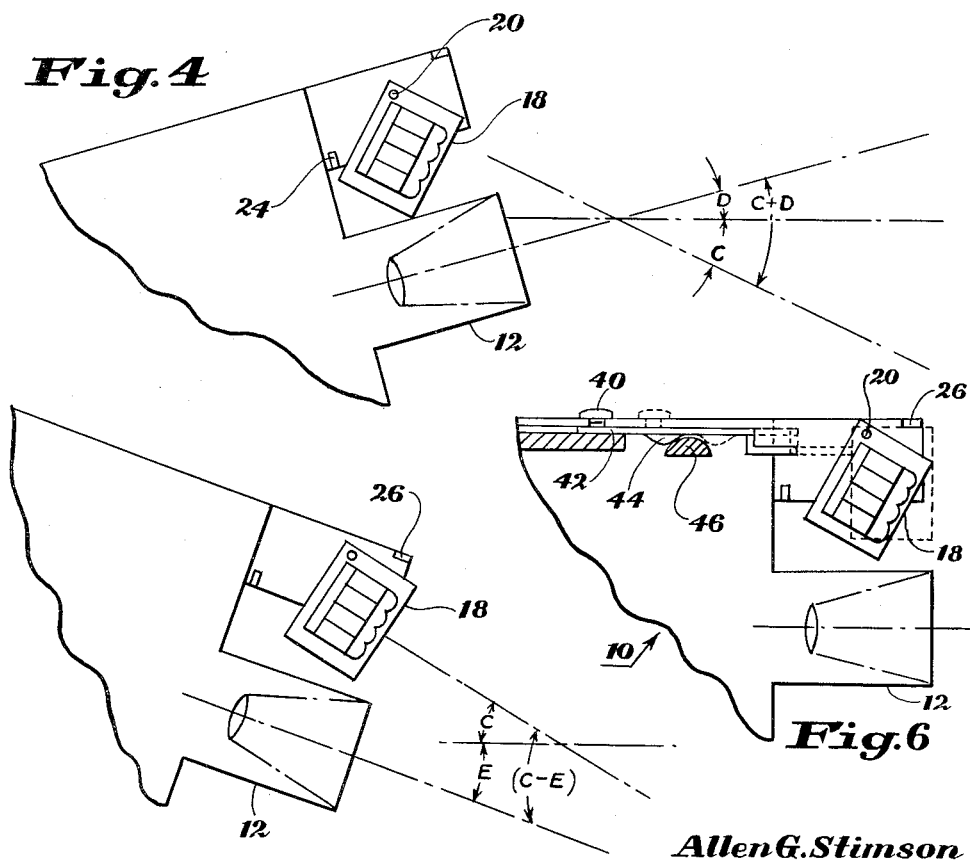
Allen G. Stimson
INVENTOR.

March 6, 1962 A. G. STIMSON 3,023,684
CAMERA WITH PENDULAR PHOTOCELL
Filed Dec. 5, 1958 4 Sheets-Sheet 3
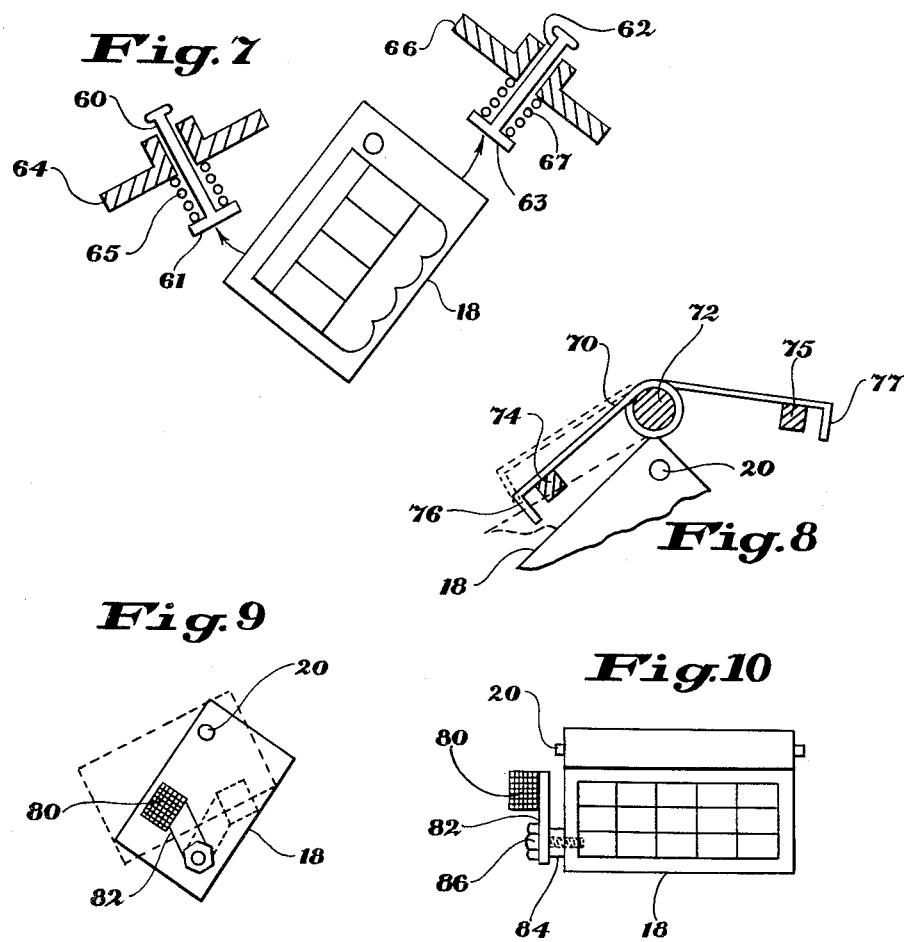
Allen G. Stimson
INVENTOR.
R. Frank Smith
BY Robert W. Hampton
ATTORNEYS United States Patent Office 3,023,684
Patented Mar. 6, 1962

3,023,684
CAMERA WITH PENDULAR PHOTOCELL
Allen G. Stimson, Rochester, N.Y., assignor to Eastman Kodak Company, Rochester, N.Y., a corporation of New Jersey
Filed Dec. 5, 1958, Ser. No. 778,349
14 Claims. (Cl. 95—10)

The present invention concerns cameras having attached or built-in photocells and more particularly concerns means for automatically controlling the range of elevation angle from which light is admitted into such a photocell when the camera is tilted at various angles relative to the horizontal.

Many prior art cameras have attached or built-in photocells, constituting part of an exposure meter or an automatic exposure control system. In most cameras of this type the face of the photocell moves with the camera when the latter is tilted upward or downward. When such a camera is tilted upward the photocell receives additional sky light and responds by either indicating or setting a diaphragm aperture or a shutter speed that is commensurate with the brighter background lighting. Consequently, foreground objects are underexposed when a picture is taken at this setting of the camera.

It is therefore a principal object of the present invention to ensure uniform exposure of foreground objects by a camera, even when the camera is tilted upward or downward. In a camera having an attached or built-in exposure meter or automatic exposure control system, this object is achieved by suspending the photocell of the meter or control system pendularly from the camera body.

A more specific object of the invention is to maintain the axis of a photocell at a fixed angle below the horizontal, regardless of the elevation of a camera to which the photocell is attached.

Another object is to maintain the axis of a photocell at an adjustably predetermined angle relative to the lens axis of a camera to which the photocell is attached.

A further object, with respect to a photocell pendularly mounted on a camera, is to limit the range of angular movement of the photocell relative to the camera.

Another object is to yieldably limit such angular movement.

A further object is to adjust the center of gravity of a photocell which is pendularly suspended from the body of a camera.

Other objects of the invention will appear from the following description, reference being made to the accompanying drawings, wherein:

FIGS. 3–5 are schematic side views of the front portion of the camera showing the relation of the photocell and lens axis when the lens axis is at various angles to the horizontal;

FIG. 6 is a side view of one form of photocell locking mechanism;

FIG. 7 is a side view of one form of resilient stop for the photocell;

FIG. 8 is a side view of a second form of a resilient stop;

FIG. 9 is a side view of a mechanism for adjusting center of gravity of a photocell;

FIG. 10 is a front view of the mechanism shown in FIG. 9;

FIG. 11 is a front view of a second form of photocell locking mechanism; and

Figure 1:
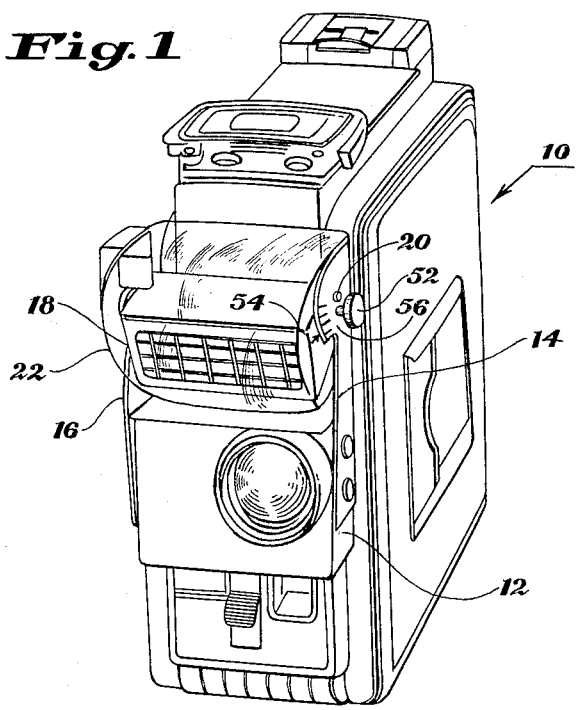
FIG. 1 is a perspective view of a camera embodying the present invention.
Figure 2:
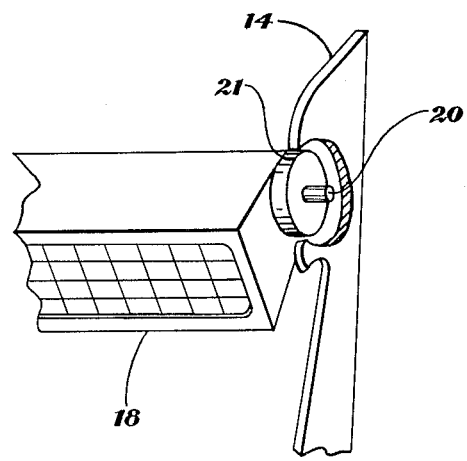
FIG. 2 is a perspective view, partly broken away, showing a detail of the photocell mounting.

Referring to FIG. 1, a camera 10, which may be a still camera or a motion picture camera, is provided with the usual front lens mount 12 and has a pair of vertical side plates 14 and 16 adjacent to or flanking the lens mount on the front of the camera. A photocell unit 18, which may be used, for example, to operate an exposure meter or an automatic exposure control system of the camera, as well known in the art, is pivoted on plates 14 and 16 at 20, above its center of gravity, and forms a pendulum. The photocell unit includes a case 15, a lens block 17 and a light sensitive surface 19 behind the lens block. This surface may be formed of any light sensitive material, such as metallic selenium or cadmium sulfide and receives light through the lens block along an axis generally perpendicular to surface 19. A respective spacer, such as 21, may be used to separate photocell unit 18 from each support plate 14 and 16. The arcuate path along which the photocell unit moves pendularly relative to the camera, when the latter is tilted upward and downward, may be encased in a transparent cover 22, which may be made, for example, of any suitable plastic material.

When the lens axis is horizontal, as shown in FIG. 3, the photocell axis is declined below the horizontal by an angle C, which may be, for example, 15°. Thus, a significant portion of sky light is excluded from the photocell while light from the subject is admitted, thereby energizing the photocell for a proper exposure of a foreground subject.

When the camera is tilted above the horizontal by an angle D, as shown in FIG. 4, the photocell unit remains fixed in space and the camera rotates relative to the photocell unit about pivot 20. The photocell axis remains declined below the horizontal by the angle C; therefore the photocell axis is declined by the angle $C+D$ below the lens axis and sky light remains excluded as if the lens axis were horizontal. A rigid stop 24 may be fixed to the camera to limit the relative angular movement of the camera and photocell unit. When the camera is tilted upward so far that stop 24 engages the photocell unit, the latter thereafter moves with the camera, and the pendular action of the photocell unit ceases.

When the camera is tilted downward by an angle E, as shown in FIG. 5, the photocell axis remains at angle C below the horizontal and therefore assumes an angle $C-E$ relative to the lens axis. A rigid stop 26 may be provided on the camera to limit the relative movement of the camera and photocell unit during downward tilting of the camera.

Figure 12:
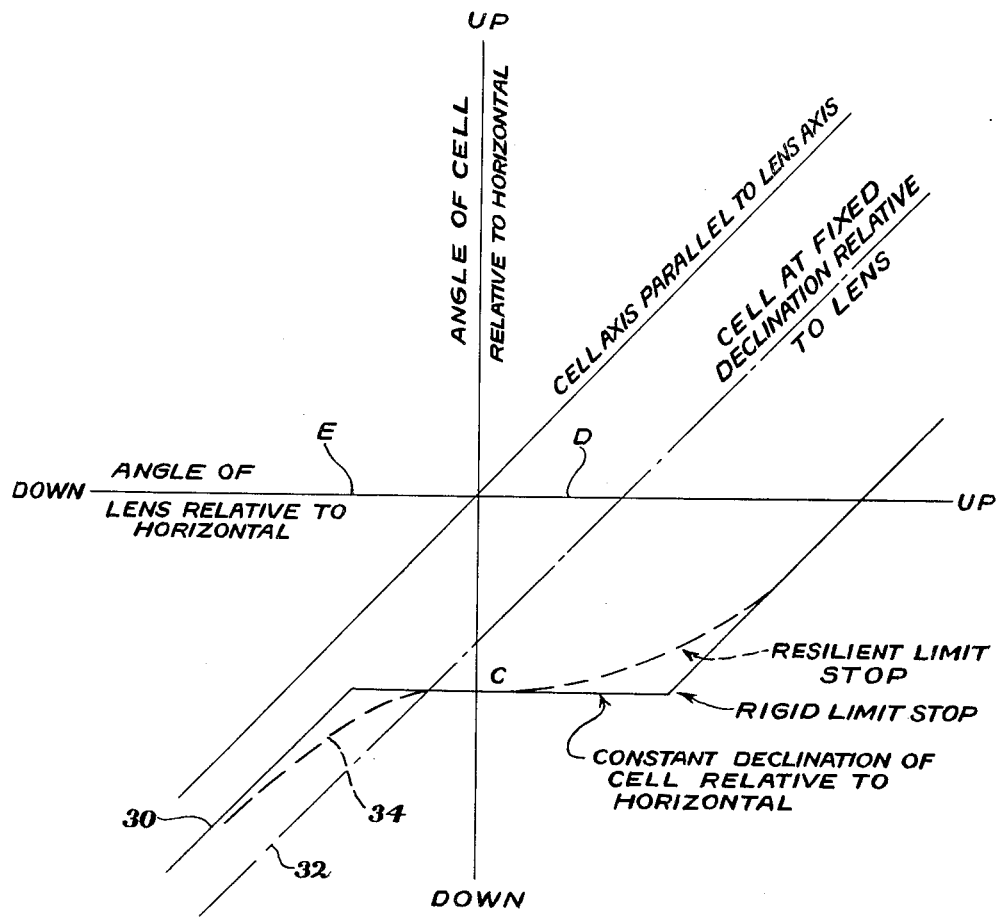
FIG. 12 is a graph illustrating the relation between the horizontal and the cell and lens axes of the camera.

If rigid stops 24 and 26 are used, the angular movements of the lens and photocell axes relative to the horizontal are shown graphically in FIG. 12 by the solid line 30.

Means may be provided to fix the angular relation of the lens and cell axes. Referring to FIG. 6, a slide button 40 mounted in an appropriate longitudinal slot (not shown) in the top of the camera is attached to a longitudinally guided leaf spring 42. Spring 42 has a rounded projection 44 cooperating with a similar fixed projection 46 secured to the camera. Projections 44 and 46 cooperate to detent spring 42 in either of two longitudinal positions. When spring 42 is moved to its forward position by manual operation of button 40, as shown by broken lines in FIG. 6, its forward edge engages the rear surface of photocell unit 18 and rocks that unit about pivot 20 until the photocell unit engages the fixed stop 26. Thereafter, until spring 42 is returned to its rearward position, the photocell axis remains at a fixed angle relative to the lens axis. For many purposes, it may be desired to establish this fixed angle as 0°, i.e., parallelism between the photocell and lens axes.

In FIGS. 1 and 11 are shown means for fixing the angular relation of the lens and cell axes at any desired angle within the range determined by the limit stops. A set screw 50 extends through support plate 14 of the camera and cooperates with a side of photocell unit 18. A knurled head 52 on the set screw is employed for manually adjusting the set screw to engage or disengage the photocell unit and thereby hold the latter in any desired angular position, about pivot 20, relative to the camera. The angle of declination of the photocell axis can be determined by the position of an index mark 54 (FIG. 1) on the side of the photocell unit, in relation to a scale 56 on a support plate 14. Obviously the positions of the index mark and scale may be reversed.

The angular relation of the photocell and lens axes, when the cell is locked relative to the camera, is shown in FIG. 12 by line 32.

In many cases it may be desirable to avoid the abrupt transition from pendular action of the cell to the locked action that occurs when a limit stop on the camera engages the photocell unit. In FIG. 12, it is recalled that when the photocell unit is free to rotate within the range defined by rigid limit stops, the cell and lens axes have the relation shown by the solid line 30. This line has two abrupt changes of slope representing the engagement of the respective rigid limit stops 24 and 26 (FIGS. 4 and 5) with the photocell unit. It has been found that the use of resilient limit stops elimintes the abrupt transition from pendular to locked action and establishes a relative angular motion defined in FIG. 12 by the curved broken lines such as 34.

One form of resilient limit stop is shown in FIG. 7 and comprises a pair of plungers 60 and 62 and having respective heads 61 and 63 that are adapted to engage the photocell unit 18. Plungers 60 and 62 are mounted in apertures of respective frame members 64 and 66 of the camera and have respective compression springs 65 and 67 secured between the frame members and the plunger heads. Springs 65 and 67 provide a resilient stopping action when a plunger head engages the photocell unit.

A second form of resilient limit stop is shown in FIG. 8 and comprises a torsion spring 70 mounted on a fixed stub shaft 72. Spring 70 has its extremities in engagement with a pair of fixed stops 74 and 75 and has formed ends 76 and 77 that cooperate with surfaces of the photocell unit 18. When the camera is tilted far enough to move a spring end 76 and 77 against the photocell unit, spring 70 flexes to resiliently limit the relative movement of the camera and photocell unit, until a fixed stop 74 or 75 engages the photocell, as shown by broken lines in FIG. 8.

If it should be desired to adjust the angle C, i.e., the angle of declination of the photocell axis below the lens axis, but to retain the pendular action of the photocell unit, means may be provided to adjust the position of the center of gravity of the photocell unit. Referring to FIGS. 9 and 10, a weighted member 80 is mounted by an arm 82 on a bored hub 84. The hub is mounted by a threaded bolt 86 on the side of the photocell unit 18 for frictional rotation with respect thereto. Rotation of the hub and its attached arm and weight adjusts the center of gravity of the photocell unit and the latter then rotates by its pendular action until its center of gravity is vertically beneath pivot 20.

The invention has been described in detail with particular reference to preferred embodiments thereof, but it will be understood that variations and modifications can be effected within the spirit and scope of the invention as described hereinabove and as defined in the appended claims.

I claim:

1. A camera having an axial lens system, in combination with: a photocell unit having a light sensitive surface adapted to receive light along an axis of said unit; and a pivotal, free-turning pendular support for said photocell unit on said camera to maintain the axis of said photocell unit at a fixed angle relative to the horizontal when said camera is tilted relative to the horizontal.

2. The combination defined in claim 1, with: at least one limit stop secured to said camera and disposed in cooperative relation with said photocell unit to limit relative angular movement of the camera and photocell unit.

3. The combination defined in claim 2, wherein said limit stop is resilient.

4. The combination defined in claim 2, with: a spring member cooperating with said limit stop to provide resilient engagement between said stop and the photocell unit.

5. The combination defined in claim 2, wherein said limit stop comprises a spring member.

6. The combination defined in claim 5, with: a rigid stop member disposed in cooperative relation with said photocell unit for limiting the travel of said photocell unit in engagement with said spring member.

7. The combination defined in claim 1, with: a pair of limit stops secured to said camera and disposed in cooperative relation with said photocell unit for bidirectionally limiting the relative angular movement of the camera and photocell unit.

8. The combination defined in claim 1, with: control means cooperating with said photocell unit for releasably locking the latter in a fixed angular relation to the axis of said lens system.

9. The combination defined in claim 8, wherein said control means comprises a limit stop effective, in response to tilting of the camera beyond a predetermined angle, to prevent movement of the photocell relative to the camera.

10. The combination defined in claim 8, wherein said control means includes a manually operable member adapted to engage a first surface of said photocell unit for rotating the latter relative to the camera; a stop member adapted to engage a second surface of said photocell unit for limiting said rotation; and means for detenting said manually controlled member in either engagement or disengagement with said first surface of the photocell unit.

11. The combination defined in claim 8, wherein said control means comprises a support member integral with said camera; a clamping device guided by said support member for motion toward and away from a surface of said photocell unit for clamping and unclamping said photocell unit relative to said camera; and manually operable means for moving said clamping device.

12. The combination defined in claim 11, with a scale and a fiducial mark disposed in cooperative relation, one on said camera and the other on a surface of said photocell unit.

13. The combination defined in claim 1, with: means for moving the center of gravity of said photocell unit, comprising a weighted member constituting a part of said photocell unit; and means adjustably securing said weighted member to the remainder of said photocell unit.

14. The combination defined in claim 1, with a transparent cover member secured in fixed relation to said camera and substantially enclosing said photocell unit, regardless of the position of said unit relative to said camera.

References Cited in the file of this patent

UNITED STATES PATENTS

| | | |
|---|---|---|
| 1,482,244 | Morton | Jan. 29, 1924 |
| 2,126,338 | Mihalyi | Aug. 9, 1938 |
| 2,186,611 | Martin | Jan. 9, 1940 |
| 2,363,796 | Lamb | Nov. 28, 1944 |
| 2,630,735 | Rouy | Mar. 10, 1953 |
| 2,899,878 | Farinet | Aug. 18, 1959 |

FOREIGN PATENTS

| | | |
|---|---|---|
| 455,774 | Great Britain | Oct. 19, 1936 |
| 877,078 | France | Aug. 20, 1942 |
| 258,022 | Switzerland | Apr. 16, 1949 |